Sept. 4, 1951 — H. LYON — 2,566,573
EXPANSIBLE PIN STRUCTURE
Filed March 4, 1946
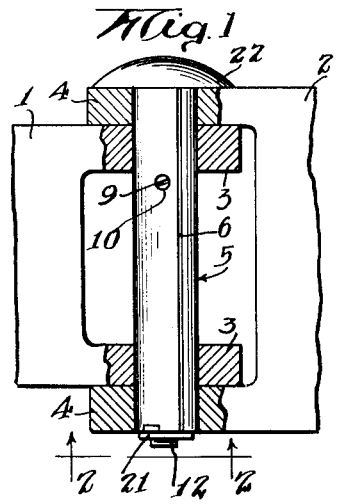
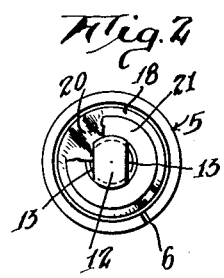
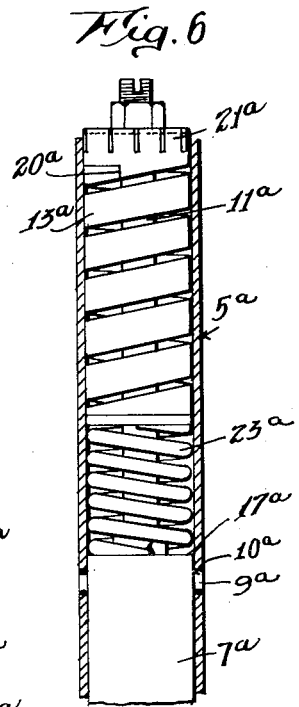
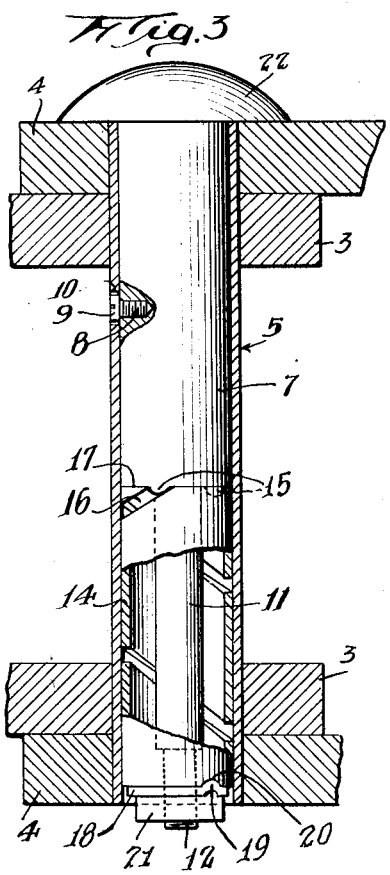
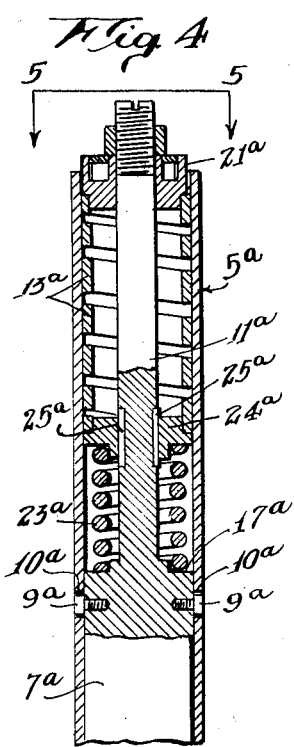
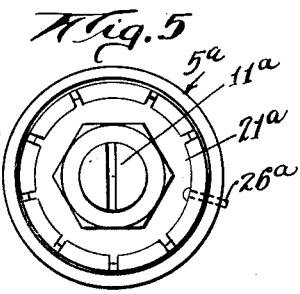
Inventor
Hyland Lyon
By Lyon & Lyon
Attorneys Patented Sept. 4, 1951

2,566,573

UNITED STATES PATENT OFFICE 2,566,573

EXPANSIBLE PIN STRUCTURE

Hyland Lyon, Los Angeles, Calif.

Application March 4, 1946, Serial No. 651,757

7 Claims. (Cl. 188—83)

This invention relates to expansible pin structures, and more particularly to expansible pins which are adapted to form elements of friction clutches for controlling relative rotation of two associated elements.

In its simplified form and adaptation this invention is illustrated as a means of controlling the relative rotation of two elements of a hinge or hinged structure. In this illustration my invention is utilized as an expansible hinge pin for imposing a frictional drag or resistance to the free rotation of the said hinge elements around or with relation to said hinge pin or to each other.

It is therefore an object of this invention to provide an expansible pin or friction clutch device which incorporates a sleeve, shaft or pin adapted to act as a friction element and means for expanding the said sleeve, shaft or pin in position.

Another object of this invention is to provide an expansible pin or friction clutch adapted to frictionally resist the free rotation of two elements or parts connected therewith and which includes a split sleeve, shaft or pin, and means adapted to expand said sleeve, shaft or pin in position to determine the degree of frictional resistance to rotation of said elements or parts.

Another object of this invention is to provide an expansible pin or clutch device adapted to control relative rotation of two elements or members connected thereby and which utilizes a split cylindrical member adapted to be expanded between said elements or members to determine the resistance to rotation thereof, and means acting from within the said cylindrical member for accurately, simply and easily controlling the degree of expansion thereof.

Other objects and advantages of my invention it is believed will be apparent to those skilled in this art from the hereinafter contained description of my invention as illustrated in the accompanying drawings.

In the drawings:

Figure 1 is a fragmental elevation partly in section of a hinge structure incorporating an expansible pin or clutch embodying my invention.

Figure 2 is an end elevation looking in the direction of the line 2—2 of Figure 1, and partly in section.

Figure 3 is a sectional elevation on a larger scale of the expansible pin or clutch element of the structure illustrated in Figure 1.

Figure 4 is a sectional view of a modified form of my invention illustrating the expansible shaft, sleeve or pin thereof in section.

Figure 5 is an end view looking in the direction of the line 5—5 of Figure 4.

Figure 6 is a sectional elevation of the device of Figure 4.

In the form of my invention illustrated in Figures 1 to 3, inclusive, the device is shown as an expansible hinge pin of a hinge. The hinge includes the relatively rotatable hinge members 1 and 2 having overlapping eye sections 3, 3 and 4, 4 through which the hinge pin or clutch element 5 is passed. The hinge member rotates around the said clutch element 5.

Means are provided for expanding the clutch element 5 which in this modification may be of the following construction: The clutch element 5 is in the form of a split sleeve or cylinder slit longitudinally as indicated at 6. Mounted within the split clutch 5 is an anchor pin 7 which is held from rotation within the clutch 5 by one or more cap screws 8 threaded into the pin 7 and having its head 9 fitted within a hole 10 formed through the clutch 5. The pin 7 has a section 11 of reduced diameter, which is threaded at its outer end 12 and is flattened to provide one or more flat sides 13. A wide spiral spring 14 is mounted within the clutch 5 concentric with the reduced section 11 of the pin 7. The spring 14 is held from relative rotation by means of lugs or stops 15 formed at the shoulder end of the spring 7 adapted to enter the extremities of the spiral slot 16 between the convolutions of the spring. The spring 14 is squared off at its opposed ends to engage the pin shoulder 17 and the stop washer 18. The stop washer 18 is deformed to provide a stop 19 adapted to engage within a notch 20 formed in the end of the spring 14.

The stop washer 18 has a flattened side hole formed therein to fit the flattened sides 13 of the section 11 of the pin 7, thus holding the parts from relative rotation within the clutch 5. A nut 21 is threaded upon the threaded end 12 of the pin 7. The pin 7 has a head 22 at its end opposite the nut 21 to hold the pin within the split clutch 5.

By threading the nut 21 on the threading of the pin 7 the wide helical spring 14 is compressed increasing the diameter of the spring and the expansive force of the spring 14 determines the degree of expansion of the split clutch 5 within the eyes 3, 3 and 4, 4 of the hinge members 1 and 2. A very fine adjustment of this frictional resistance may be had by this expansion so that the hinge members may be held against rotation to just that degree desired.

In the modified form of my invention illustrated in Figures 4 to 6, inclusive, similar parts are indicated with similar numerals with the addition of an exponent "a" thereto.

In this modification a secondary spring 23ª is utilized to exert an axial force against the primary spring 13ª to compensate for any change in the diameter of the journal or housing within which the clutch 5ª is positioned as, for example, the eyes 3, 3 and 4, 4 of the hinge members 1 and 2.

In this modification the elements of the clutch expanding means are held from rotation by the following means: The pin 7ª is held from rotation within the clutch 5ª by means of the screws 9ª fitted within the holes 10ª. The secondary compression spring 23ª is seated at one end against the shoulder 17ª and engages a collar 24ª at its opopsite end. The collar 24ª is splined to the pin section 11ª by means of splines 25ª which permit relative axial movement of the collar 24ª and pin section 11ª but prevent relative rotation. The collar or washer 21ª which engages the upper end of the primary spring 13ª has a stop section 20ª which engages the end of the spring 13ª. A similar stop is provided between collar 24ª and the lower end of the spring 13ª. The washer 21ª may be held from rotation by means of a pin 26ª which engages within corresponding grooves formed in the washer 21ª and clutch 5ª, respectively.

Obviously other modifications of my invention are possible, all within the scope of my invention as defined in the appended claims. Also it is evident that the clutch of my invention is not limited to use as a hinge pin but is of wide and extended applicability where a quickly adjusted, finely controlled clutch or friction gripping means is desired.

I claim:

1. An expansible pin for frictional engagement with a surrounding journal, involving: a split tubular element adapted to be positioned within a journal; a spiral member within said tubular element; means for anchoring the opposite ends of said spiral member; and means for axially compressing the spiral member to cause said spiral member to expand said tubular element.

2. An expansible pin for frictional engagement with a surrounding journal, involving: a cylindrical element having a longitudinal split; a pin mounted within the cylindrical element; means for holding the pin against rotation relative to said cylindrical element, said pin having a section of reduced diameter; a helical spring mounted concentrically with said section of reduced diameter; and means engageable with extremities of the spring for holding both extremities of said spring against rotation relative to said pin; and means screw-threaded on said pin at its reduced section for compressing said spring thereby to expand said spring and the surrounding cylindrical element radially.

3. An expansible pin for frictional engagement with a surrounding journal, involving: a split sleeve adapted to be positioned within a journal; a pin mounted within said split sleeve; means for holding the split sleeve and pin against relative rotation but permitting radial expansion of said sleeve; a helical band spring mounted within the sleeve; means for restraining both ends of said spring against rotation relative to said pin; and means for axially compressing the spring to expand said spring and sleeve radially.

4. An expansible pin for frictional engagement with a surrounding journal, involving: a split sleeve adapted to be positioned within a journal; a pin mounted within the split sleeve; a helical band spring also within said sleeve, means for holding the spring against rotation relative to the pin; and means for compressing the spring to expand said spring and sleeve radially.

5. An expansible pin for frictional engagement with a surrounding journal, involving: a longitudinally split radially expansible sleeve adapted to be located within a journal; a helical band spring within said sleeve; means for anchoring the extremities of said spring against relative rotation but permitting axial compression; and means for effecting axial compression of said spring thereby to cause radial expansion of said spring and surrounding sleeve and regulate the fit of said sleeve.

6. An expansible pin for frictional engagement with a surrounding journal, involving: a longitudinally split radially expansible sleeve adapted to be located within a journal; a helical band spring within said sleeve; means for anchoring the extremities of said spring against relative rotation but permitting axial compression; and yieldable means for exerting a predetermined compression force against said spring to effect radial expansion of said spring and surrounding sleeve thereby.

7. An expansible pin, involving: a stem; a pair of coil springs mounted in tandem thereon; means for axially compressing said springs to effect radial expansion thereof; and a split sleeve surrounding said springs, one of said springs being larger than the other and adapted to engage the walls of and expand said sleeve, the smaller of said springs being free of said sleeve and tending to maintain a predetermined force on said larger spring thereby to maintain a corresponding expansion force on said sleeve.

HYLAND LYON.

REFERENCES CITED

The following references are of record in the file of this patent:

UNITED STATES PATENTS

| Number | Name | Date |
| --- | --- | --- |
| 454,243 | Witham | June 16, 1891 |
| 531,884 | Watrous | Jan. 1, 1895 |
| 1,847,937 | Fitters | Mar. 1, 1932 |

FOREIGN PATENTS

| Number | Country | Date |
| --- | --- | --- |
| 27,382 | Great Britain | Nov. 22, 1898 |